United States Patent
Tateishi et al.

(10) Patent No.: US 7,164,631 B2
(45) Date of Patent: Jan. 16, 2007

(54) INFORMATION RECORDING APPARATUS

(75) Inventors: Kiyoshi Tateishi, Saitamaken (JP); Junichi Furukawa, Saitama-ken (JP)

(73) Assignee: Pioneer Coorperation, Tokyo (JP)

( * ) Notice: Subject to any disclaimer, the term of this patent is extended or adjusted under 35 U.S.C. 154(b) by 351 days.

(21) Appl. No.: 10/452,223

(22) Filed: Jun. 3, 2003

(65) Prior Publication Data
US 2003/0227841 A1 Dec. 11, 2003

(30) Foreign Application Priority Data
Jun. 6, 2002 (JP) .............................. 2002-165779

(51) Int. Cl.
*G11B 7/125* (2006.01)
(52) U.S. Cl. .............................. 369/44.34; 369/53.23; 369/53.28
(58) Field of Classification Search .................... None
See application file for complete search history.

(56) References Cited

U.S. PATENT DOCUMENTS

| | | | | |
|---|---|---|---|---|
| 4,628,497 A | * | 12/1986 | Bierhoff | 369/44.34 |
| 4,633,453 A | * | 12/1986 | Ogawa | 369/44.34 |
| 4,795,958 A | * | 1/1989 | Nakamura et al. | 369/44.34 |
| 4,813,031 A | * | 3/1989 | Bierhoff | 369/44.34 |
| 5,329,508 A | * | 7/1994 | Matsueda | 369/44.34 |
| 5,724,170 A | * | 3/1998 | Aizawa | 398/197 |
| 6,222,814 B1 | * | 4/2001 | Ichimura | 369/116 |
| 6,898,223 B1 | * | 5/2005 | Seo | 369/116 |

FOREIGN PATENT DOCUMENTS

| | | | |
|---|---|---|---|
| JP | 59157854 | * | 9/1984 |
| JP | 01049130 | * | 2/1989 |
| JP | 02014435 | * | 1/1990 |
| JP | 05120704 | * | 5/1993 |

\* cited by examiner

*Primary Examiner*—Andrea Wellington
*Assistant Examiner*—Jorge L. Ortiz-Criado
(74) *Attorney, Agent, or Firm*—Arent Fox PLLC

(57) ABSTRACT

An information recording apparatus is provided, which can control over the power of light beams emitted from a light source and various types of servo control with higher accuracy. A laser beam is emitted from a semiconductor laser to write information onto an optical disc. A detection signal indicative of the power of the laser beam output from a light-receiving device is sampled and held with a sample and hold circuit via an I-V converter at a timing delayed by the time corresponding to the delay time of the I-V converter. A tracking error generation circuit and a focus error generation circuit generate a tracking error signal and a focus error signal, respectively, on the basis of a detection signal having information about tracking error and focus error and output from a light-receiving device. Sample and hold circuits sample and hold the tracking error signal and the focus error signal at a timing delayed by the time corresponding to the delay time of each of the generation circuits, respectively. Power control, tracking servo, and focus servo are performed using each of the signals held by the sample and hold circuits, respectively.

4 Claims, 8 Drawing Sheets

FIG.3

| FREQUENCY OF CLOCK SIGNAL CK | DELAY TIME $\tau 0$ OF SAMPLE AND HOLD SIGNAL SHP | DELAY TIME $\tau 1$ | DELAY TIME $\tau 2$ | DELAY TIME $\tau 3$ |
|---|---|---|---|---|
| $f_{ck1}$ | $\tau 0 = \tau 01$ | $\tau 1 = \tau 011$ | $\tau 2 = \tau 21$ | $\tau 03 = \tau 31$ |
| $f_{ck2}$ | $\tau 0 = \tau 02$ | $\tau 1 = \tau 12$ | $\tau 2 = \tau 22$ | $\tau 3 = \tau 32$ |
| $f_{ck3}$ | $\tau 0 = \tau 03$ | $\tau 1 = \tau 13$ | $\tau 20 = \tau 23$ | $\tau 3 = \tau 33$ |
| ····· | ····· | ····· | ····· | ····· |

INFORMATION RECORDING APPARATUS

BACKGROUND OF THE INVENTION

The present invention relates to an information recording apparatus which utilizes light beams to write information onto information storage media.

The present application claims priority from Japanese Application No. 2002-165779, the disclosure of which is incorporated herein by reference.

A conventional information recording apparatus for writing information onto a write-once or rewritable information storage medium (hereinafter generally referred to as an "optical disc") includes various types of servo systems APC and FT as shown in the block diagram illustrated in FIG. 7.

The servo system APC provides feedback control on the power supplied to a semiconductor laser LD provided in a pickup PU, in order to set the laser beam (hereinafter referred to as a "write laser beam") Po emitted from the semiconductor laser LD at a predetermined target value.

The servo system FT performs focus servo and tracking servo to properly illuminate the recording surface of the optical disc with the write laser beam Po.

More specifically, the pickup PU is provided with the aforementioned semiconductor laser LD, a light-receiving device PD, a light-receiving device OEIC having a plurality of photoelectric transducers split into a plurality of planes, a half mirror HM, and a lens assembly (shown without reference symbols). The pickup PU also includes a focus actuator F for focusing the write laser beam Po onto the recording surface of the optical disc DSC and a tracking actuator T for positioning the write laser beam Po over the desired track on the recording surface.

For example, when write data Dwt such as image data or audio data and a clock signal CK for setting the timing of a write operation are supplied to a pulse generator 1, a write signal NRZI corresponding to the write data Dwt is generated in sync with the clock signal CK.

A drive circuit 2 supplies a drive current Iwt corresponding to the level of the write signal NRZI to the semiconductor laser LD, thereby allowing the semiconductor laser LD to emit the write laser beam Po corresponding to the write data Dwt.

The write laser beam Po is reflected off the half mirror HM with a predetermined reflectivity and then passes through the aforementioned optical system to impinge upon the recording surface of the optical disc DSC, thereby allowing information to be written thereon.

The light-receiving device PD receives part of the write laser beam Po (a transmitted beam) which has passed through the half mirror HM, thereby outputting a detection signal Sapc indicative of the power (light intensity) of the write laser beam Po.

The plurality of photoelectric transducer planes of the light-receiving device OEIC receive, through the half mirror HM, reflected beams caused when the write laser beam Po impinges upon the optical disc DSC, thereby outputting a detection signal Sft containing information on focus and tracking errors.

The servo system APC allows an I-V (current to voltage) converter 3 to convert the detection signal Sapc into a detection signal Vapc, and then allows a sample and hold circuit 4 to sample and hold the detection signal Vapc, thereby supplying the resulting detection signal Vsh to a feedback control circuit 5.

The feedback control circuit 5 then determines the difference $\Delta V$ between a predetermined target value and the detection signal Vsh to make fine adjustments to the level of the drive current Iwt output from the drive circuit 2 so that the difference $\Delta V$ takes on a predetermined value (e.g., zero), thereby allowing the semiconductor laser LD to emit the write laser beam Po at an appropriate power.

The servo system FT has a tracking error generation circuit 6, a focus error generation circuit 7, and sample and hold circuits 8, 9, with the generation circuits 6 and 7 formed as circuitry having operational functions and a plurality of subtractors and adders connected in multiple stages.

The tracking error generation circuit 6 allows the plurality of subtractors and adders to perform operational processing on a plurality of detection signals Sft output from the plurality of photoelectric transducer planes provided in the light-receiving device OEIC, thereby generating a tracking error signal Ste. The sample and hold circuit 8 then samples and holds the tracking error signal Ste at a predetermined timing, thereby outputting a tracking servo signal TE for providing servo control to the tracking actuator T.

The focus error generation circuit 7 allows a plurality of differential amplifiers and adders to perform operational processing on a plurality of detection signals Sft, thereby generating a focus error signal Sfe. The sample and hold circuit 9 then samples and holds the focus error signal Sfe at a predetermined timing, thereby outputting a focus servo signal FE for providing servo control to the focus actuator F.

In this step, the pulse generator 1 outputs a sample and hold signal SHP in sync with the write signal NRZI, and the sample and hold circuits 4, 8, and 9 perform the aforementioned sample and hold operation in sync with the sample and hold signal SHP, so that the detection signal Vsh, the tracking servo signal TE, and the focus servo signal FE are generated at a predetermined timing.

For example, recent developments in information multimedia have raised an increasing demand for writing larger amounts of data at higher speeds. To meet this demand, it has become extremely critical to provide further improved performance to power control of the semiconductor laser and to servo systems such as focus servo or tracking servo.

However, the prior art servo systems APC and FT shown in FIG. 7 had a problem that increasing the frequency fck of the clock signal CK to write information at higher speeds (i.e., shortening the period 1/fck) would degrade the accuracy in servo control.

That is, differences were found between the delay time required for the I-V converter 3 to perform current-to-voltage conversions of the detection signal Sapc into the detection signal Vapc, the delay time required for the tracking error generation circuit 6 to generate the tracking error signal Ste from the detection signal Sft, and the delay time required for the focus error generation circuit 7 to generate the focus error signal Sfe from the detection signal Sft.

This made it difficult to properly extract information about power variations, tracking error, and focus error even when the sample and hold circuits 4, 8, and 9 sample and hold each of the detection signal Vapc, the tracking error signal Ste, and the focus error signal Sfe in sync with the sample and hold signal SHP generated by the pulse generator 1. For this reason, there was a problem of a significant error in accuracy of each of the aforementioned power control, the tracking servo, and the focus servo, which are performed using the detection signal Vsh, the tracking servo signal TE, and the focus servo signal FE, output from the sample and hold circuits 4, 8, and 9, respectively.

FIGS. 8A and 8B are timing charts each illustrating exemplary waveforms of the write signal NRZI, a variation in the power of the write laser beam Po, the sample and hold signal SHP, the detection signal Vapc, and the tracking error signal Ste, FIG. 8A showing a case where information is written not at a high speed and FIG. 8B showing a case where information is written at a high speed.

As can be seen from FIGS. 8A and 8B, in the case where information is written not at a high speed (as shown in FIG. 8A), the detection signal Vapc and the tracking error signal Ste have already been generated to be at a stable level by the point in time ti at which the sample and hold circuits 4 and 8 sample and hold the same in sync with the sample and hold signal SHP. As a result, sampling and holding the signals Vapc and Ste at the time point ti makes it possible to generate the detection signal Vsh having information about power variations and tracking error, and to generate the tracking servo signal TE.

In contrast to this, in the case where information is written at a high speed (as shown in FIG. 8B), the tracking error signal Ste may not have been generated by the point in time ti at which the sample and hold circuits 4 and 8 perform the sample and hold operation in sync with the sample and hold signal SHP, even though the detection signal Vapc may have already been generated by the point in time ti.

Thus, for example, the sample and hold operation at the point in time ti may allow the detection signal Vsh having information about variations in power to have been generated, whereas allowing the tracking servo signal TE having information about tracking error not to be yet generated. This led to a significant error in control accuracy for each of the servo systems APC and FT, resulting in the failure of the entire information recording apparatus to properly write information.

SUMMARY OF THE INVENTION

The present invention was developed in view of these prior-art problems. It is therefore an object of the invention to provide an information recording apparatus which provides control to the power emitted from its light source and various types of servo control with higher accuracy, for example, upon writing information at high speeds.

To achieve the aforementioned object, the present invention provides an information recording apparatus for writing information onto an information storage medium using a light beam emitted from a light source. The information recording apparatus includes: a first detection unit for detecting a power of a light beam emitted from the light source; a second detection unit for detecting an on-track condition and an in-focus condition of the light beam relative to the information storage medium; a first generation unit for generating a detection signal indicative of a variation in power of the light beam on the basis of a detection signal output from the first detection unit; a second generation unit for generating a tracking error signal on the basis of a detection signal output from the second detection unit; a third generation unit for generating a focus error signal on the basis of a detection signal output from the second detection unit; a first control unit for adjusting the power of the light beam emitted from the light source on the basis of the detection signal generated by the first generation unit; a second control unit for performing tracking servo on the basis of the tracking error signal generated by the second generation unit; and a third control unit for performing focus servo on the basis of the focus error signal generated by the third generation unit. The first control unit samples and holds the detection signal generated by the first generation unit, in sync with a timing delayed by a time corresponding to a delay time of the first generation unit, and adjusts the power of the light beam on the basis of the detection signal held. The second control unit samples and holds the tracking error signal generated by the second generation unit, in sync with a timing delayed by a time corresponding to a delay time of the second generation unit, and performs the tracking servo on the basis of the tracking error signal held. The third control unit samples and holds the focus error signal generated by the third generation unit, in sync with a timing delayed by a time corresponding to a delay time of the third generation unit, and performs the focus servo on the basis of the focus error signal held.

According to the information recording apparatus of the present invention, the detection signal generated by the first generation unit corresponding to the power of the light beam is sampled and held in sync with a timing delayed by the time corresponding to the delay time of the first generation unit, and the power of the light beam is adjusted on the basis of the detection signal held.

Furthermore, the tracking error signal generated by the second generation unit is sampled and held in sync with a timing delayed by the time corresponding to the delay time of the second generation unit, and tracking servo is performed on the basis of the tracking error signal held.

Still furthermore, the focus error signal generated by the third generation unit is sampled and held in sync with a timing delayed by the time corresponding to the delay time of the third generation unit, and focus servo is performed on the basis of the focus error signal held.

As described above, the timings at which the detection signal for adjusting the power of a light beam, the tracking error signal for tracking servo, and the focus error signal for focus servo are sampled and held are respectively set in accordance with the delay times of the first, second, and third generation unit, thereby implementing highly accurate power adjustment, tracking servo, and focus servo.

BRIEF DESCRIPTION OF THE DRAWINGS

These and other objects and advantages of the present invention will become clear from the following description with reference to the accompanying drawings, wherein:

FIG. 3 is a schematic table showing an exemplary structure of a database having data regarding delay times stored therein;

DETAILED DESCRIPTION OF THE PREFERRED EMBODIMENTS

Figure 1:
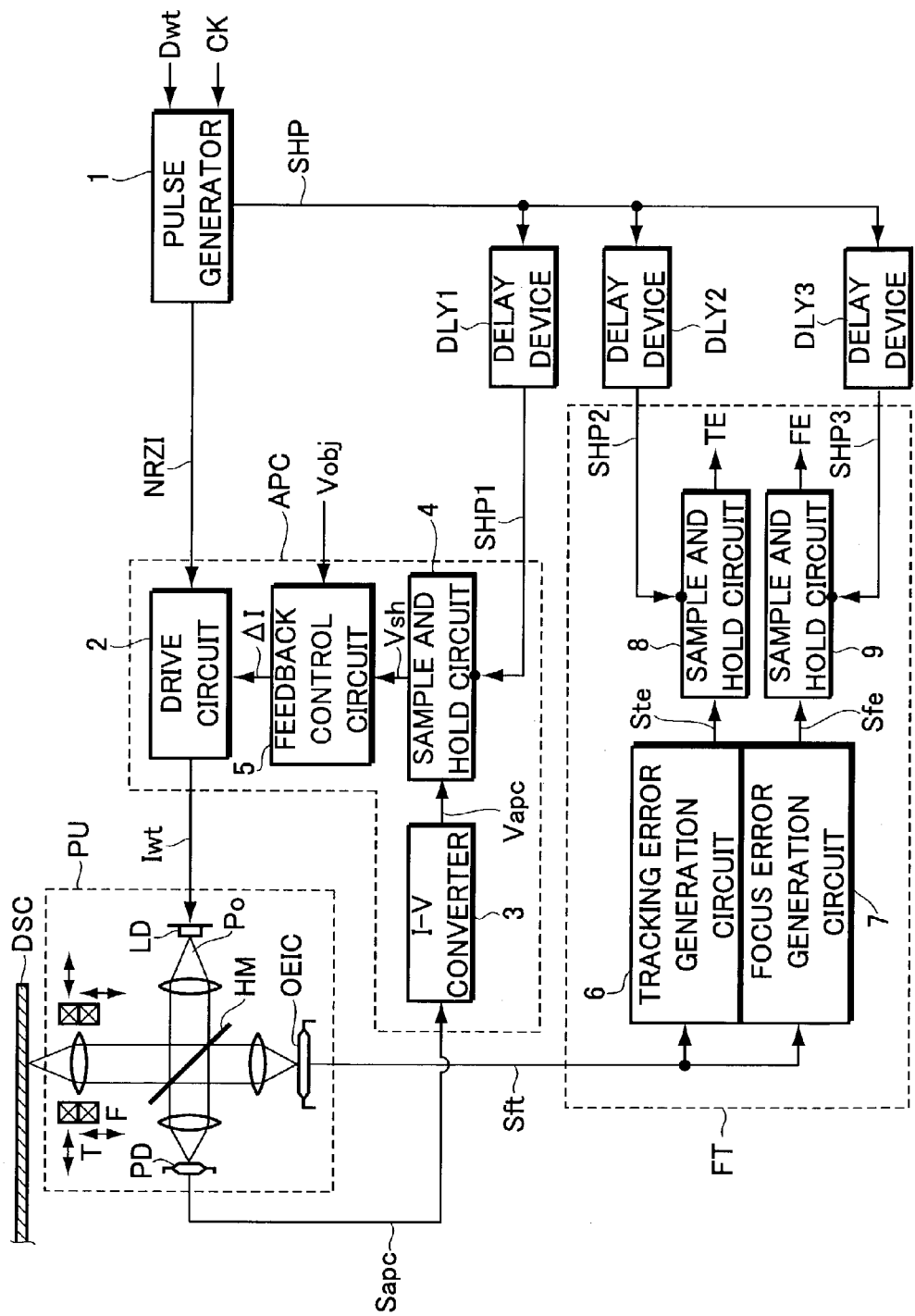
FIG. 1 is a block diagram illustrating the configuration of an information recording apparatus according to an embodiment of the present invention.

Now, the present invention will be explained with reference to the accompanying drawings in accordance with one of embodiments. FIG. 1 is a block diagram illustrating the configuration of an information recording apparatus according to the embodiment.

Referring to FIG. 1, the information recording apparatus includes a pickup PU for optically writing information onto a write-once information storage medium or a rewritable (e.g., phase change) information storage medium, a power control system APC for controlling the power of light beams emitted from a semiconductor laser LD serving as a light source incorporated into the pickup PU, and a focus tracking servo system FT for performing focus servo and tracking servo. The apparatus further includes a system controller (not shown) having a microprocessor (MPU) for intensively managing and controlling the operation of the information recording apparatus.

For example, when data to be recorded such as movie or music data is supplied from an external device to the information recording apparatus, the data is modulated or subjected to predetermined processing and converted into write data Dwt in compliance with a predetermined data format, then being supplied to the pulse generator 1.

A clock signal CK for writing the write data Dwt onto an information storage medium (hereinafter referred to as an "optical disc") DSC in sync with a predetermined timing is supplied to the pulse generator 1 under the control of the system controller.

The aforementioned clock signal CK is variably set at a predetermined frequency fcki by means of the system controller for synchronization between the rotational speed (linear speed) of the optical disc DSC and the timing with which information is recorded with the write laser beam Po (which will be discussed later).

The pulse generator 1 converts the write data Dwt into a write signal NRZI in sync with the clock signal CK so as to be outputted, and generates a sample and hold signal SHP consisting of a pulse train in sync with the write signal NRZI so as to be outputted.

The drive circuit 2 generates a drive current Iwt, the current value of which varies in response to the logic level of the write signal NRZI, and then supplies the drive current Iwt to the semiconductor laser LD, thereby allowing the semiconductor laser LD to emit a write laser beam Po corresponding to the write data Dwt.

The pickup PU has the aforementioned semiconductor laser LD, a light-receiving device PD serving as first detection unit, a light-receiving device OEIC having a plurality of photoelectric transducers split into a plurality of planes and serving as second detection unit, a half mirror HM, and a lens assembly (shown without reference symbols) responsible for writing information.

The pickup PU further has a focus actuator F for making fine adjustments to the focal position of an objective lens (shown without reference symbols) opposite to the optical disc DSC, and a tracking actuator T for making fine adjustments to the position of the objective lens opposite to the desired track of the optical disc DSC.

With this arrangement, the write laser beam Po emitted from the semiconductor laser LD in response to the write signal NRZI is reflected off the half mirror HM with a predetermined reflectivity and directed onto the recording surface of the optical disc DSC through the aforementioned objective lens or the like, thereby allowing information to be written thereon.

The half mirror HM allows a portion of the write laser beam Po to pass therethrough and the resulting transmitted beam to impinge upon the light-receiving device PD, thereby allowing the light-receiving device PD to output a detection signal Sapc indicative of the power of the write laser beam Po emitted from the semiconductor laser LD.

The half mirror HM also transmits a reflected beam caused when the write laser beam Po impinges upon the optical disc DSC, and then the plurality of photoelectric transducer planes provided in the light-receiving device OEIC receive the transmitted beam, thereby allowing a detection signal Sft to be output which contain information on focus and tracking errors.

That is, the light-receiving device OEIC is provided with the plurality of photoelectric transducer planes each disposed with a predetermined displacement relative to the optical axis which is defined by a lens assembly including the aforementioned objective lens.

This configuration allows each of the photoelectric transducer planes to output a detection signal Sft indicative of a defocused condition when the optical disc DSC is illuminated with the write laser beam Po in the defocused condition, resulting in reflected beams impinging in a dispersed condition upon the plurality of photoelectric transducer planes of the light-receiving device OEIC. On the other hand, when the optical disc DSC is illuminated with the write laser beam Po at an in-focus condition thereby causing non-dispersed reflected beams to impinge upon the plurality of photoelectric transducer planes, each of the photoelectric transducer planes outputs a detection signal Sft indicative of the in-focus condition.

Consider cases where the write laser beam Po displaced relative to the desired track on the optical disc DSC is incident thereon and where the beam without any displacement is incident upon the track (or at an on-track condition). In these cases, there is a difference in intensity between their reflected light beams, which is in turn detected with each of the photoelectric transducer planes, thereby outputting the detection signal Sft having information about tracking error.

The aforementioned power control system APC includes the I-V converter 3, the sample and hold circuit 4, and the feedback control circuit 5. The power control system APC further includes a delay device DLY1 which delays the sample and hold signal SHP output from the pulse generator 1.

Figure 2:
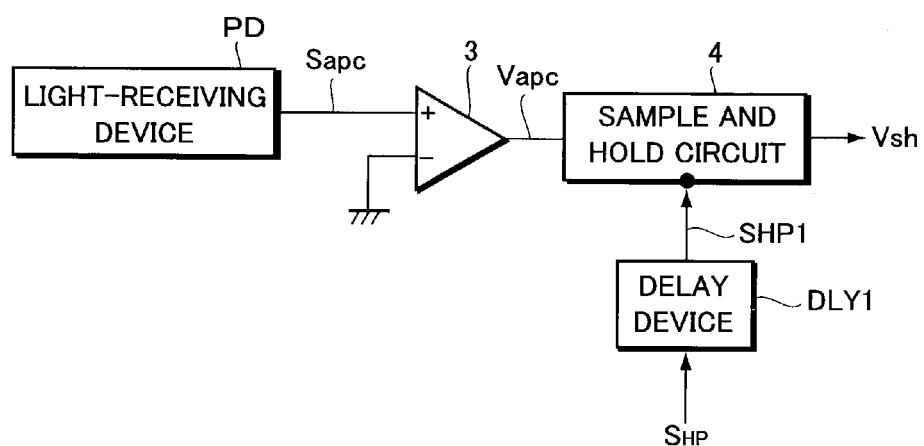
FIGS. 2A and 2B are block diagrams illustrating exemplary configurations of an I-V converter and a tracking error generation circuit.
Figure 2:
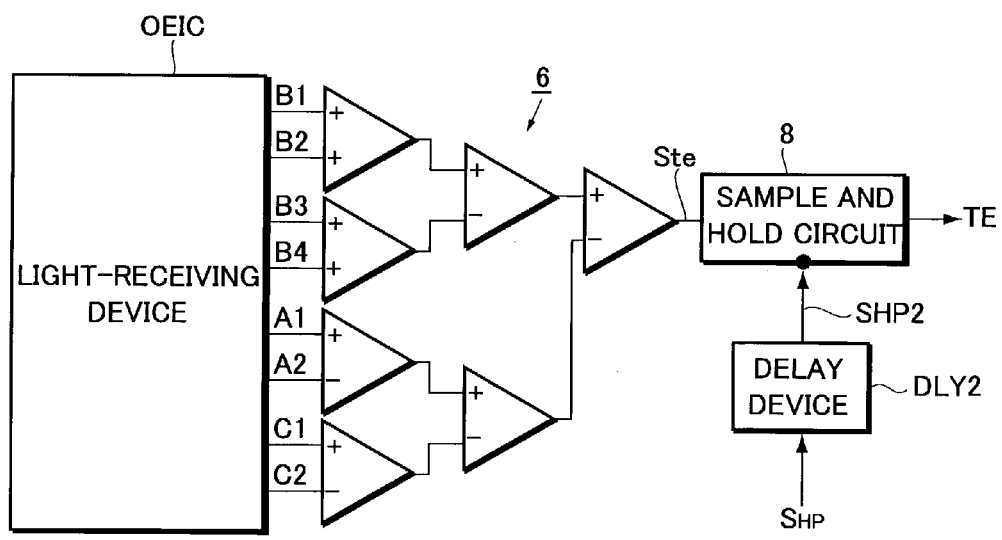

As illustrated in FIG. 2A, the I-V converter 3 is formed of an amplifier or the like by which the detection signal Sapc is amplified to a signal processable level in accordance with a predetermined amplification factor and then converted into a voltage signal or a detection signal Vapc for output.

The sample and hold circuit 4 samples and holds the detection signal Vapc in sync with a sample and hold signal SHP1 supplied from the delay device DLY1 to output the resulting voltage thus held as a detection signal Vsh having information about a variation in power.

The delay device DLY1 delays the sample and hold signal SHP output from the pulse generator 1 by a predetermined time $\tau1$, thereby outputting the sample and hold signal SHP1 which lags in phase behind the sample and hold signal SHP by the delay time $\tau1$.

The feedback control circuit 5 generates a current difference $\Delta I$ corresponding to the difference (Vobj−Vsh) between the detection signal Vsh and a predetermined target value Vobj, and then supplies the current difference $\Delta I$ to the drive circuit 2 to add it to the drive current Iwt, thereby adjusting the current value of the drive current Iwt.

That is, the power control system APC checks for a change in the detection signal Sapc with respect to the target value Vobj to detect a variation in power of the write laser beam Po as the current difference $\Delta I$, as well as to adjust the drive current Iwt on the basis of the current difference $\Delta I$, thereby providing feedback control to prevent variations in the power of the write laser beam Po.

The aforementioned focus tracking servo system FT includes the tracking error generation circuit 6, the focus error generation circuit 7, and the sample and hold circuits 8 and 9. The focus tracking servo system FT further includes delay devices DLY2 and DLY3 for delaying the sample and hold signal SHP output from the pulse generator 1.

As illustrated in FIG. 2B, the tracking error generation circuit 6 is formed as an operational circuit having a plurality of subtractors and adders connected in multiple stages. The tracking error generation circuit 6 performs the predetermined operational processing on a plurality of detection signals Sft output from each photoelectric transducer plane of the light-receiving device OEIC or the plurality of detection signals Sft indicated by reference symbols B1, B2, B3, B4, A1, A2, C1, and C2, which are shown in the figure, thereby generating the tracking error signal Ste for output.

Similar to the tracking error generation circuit 6 illustrated in FIG. 2B, the focus error generation circuit 7 is formed as an operational circuit having a plurality of subtractors and adders connected in multiple stages. The focus error generation circuit 7 performs operational processing such as subtractions or additions on a plurality of detection signals, related to the focus error, of the plurality of detection signals contained in the detection signals Sft, thereby generating the focus error signal Sfe for output.

The sample and hold circuit 8 samples and holds the tracking error signal Ste in sync with a sample and hold signal SHP2 supplied from the delay device DLY2, thereby outputting the resulting voltage thus held as the tracking servo signal TE. The sample and hold circuit 8 also provides control to supply the tracking servo signal TE to the tracking actuator T, thereby allowing the position of the objective lens to be adjusted so that the write laser beam Po is incident upon the optical disc DSC in a so-called on-track condition.

The sample and hold circuit 9 samples and holds the focus error signal Sfe in sync with a sample and hold signal SHP3 supplied from the delay device DLY3 and provides control to supply the resulting voltage thus held to the focus actuator F as the focus servo signal FE, thereby allowing the position of the objective lens to be adjusted so that the write laser beam Po is incident upon the optical disc DSC in a in-focus condition.

The delay device DLY2 delays the sample and hold signal SHP output from the pulse generator 1 by a predetermined time $\tau 2$, thereby outputting the sample and hold signal SHP2 which lags in phase behind the sample and hold signal SHP by the delay time $\tau 2$.

The delay device DLY3 delays the sample and hold signal SHP by a time $\tau 3$ to output the sample and hold signal SHP3.

The delay devices DLY1, DLY2, and DLY3 make fine adjustments to their respective delay times $\tau 1$, $\tau 2$, and $\tau 3$ in accordance with an instruction from the system controller, while the pulse generator 1 outputs the sample and hold signal SHP at a predetermined timing in accordance with the instruction from the system controller.

That is, the system controller has a dedicated memory (ROM) or the like in which a database as shown in FIG. 3 is pre-stored.

The database includes data regarding delay time $\tau 0$ for setting the timing at which the sample and hold signal SHP is generated and data regarding delay times $\tau 1$, $\tau 2$, and $\tau 3$ of their respective delay devices DLY1, DLY2, and DLY3, the data corresponding to frequencies fck1, fck2, fck3 and so forth of the clock signal CK which is set in accordance with the speed at which the write data Dwt is written.

In other words, the frequency fcki is defined in accordance with the linear speed of an optical disc, i.e., fck1 is defined as a frequency at which the optical disc DSC is rotated at the baseline linear speed (the lowest linear speed) for recording information, fck2 is defined as a frequency at which information is recorded at a linear speed, e.g., 20 times higher than the baseline linear speed, and fck3 is defined as a frequency at which information is recorded at a linear speed, e.g., 40 times higher than the baseline linear speed. Additionally, the delay times $\tau 0$, $\tau 1$, $\tau 2$, and $\tau 3$ are specified corresponding to their respective linear speeds.

The delay time $\tau 1$ corresponding to each of the frequencies fck1, fck2, fck3 and so forth is defined in a delay time group required for the I-V converter 3 to generate the detection signal Vapc from the detection signal Sapc for output.

The delay time $\tau 2$ corresponding to each of the frequencies fck1, fck2, fck3 and so forth is defined in a delay time group required for the tracking error generation circuit 6 to generate the tracking error signal Ste from the detection signal Sft for output.

The delay time $\tau 3$ corresponding to each of the frequencies fck1, fck2, fck3 and so forth is defined in a delay time group required for the focus error generation circuit 7 to generate the focus error signal Sfe from the detection signal Sft for output.

Upon writing information, in response to an instruction from a user to write information at his/her desired linear speed, the system controller supplies the clock signal CK having the frequency fcki corresponding to the instructed linear speed to the pulse generator 1. The system controller then supplies the data regarding the delay times $\tau 0$, $\tau 1$, $\tau 2$, and $\tau 3$ corresponding to the frequency fcki to the pulse generator 1 and the delay devices DLY1, DLY2, and DLY3, respectively, thereby setting the timing for generation of the aforementioned sample and hold signal SHP and the delay times $\tau 1$, $\tau 2$, and $\tau 3$.

Now, the operation of the information recording apparatus configured as such is explained with reference to FIG. 4.

Figure 4:
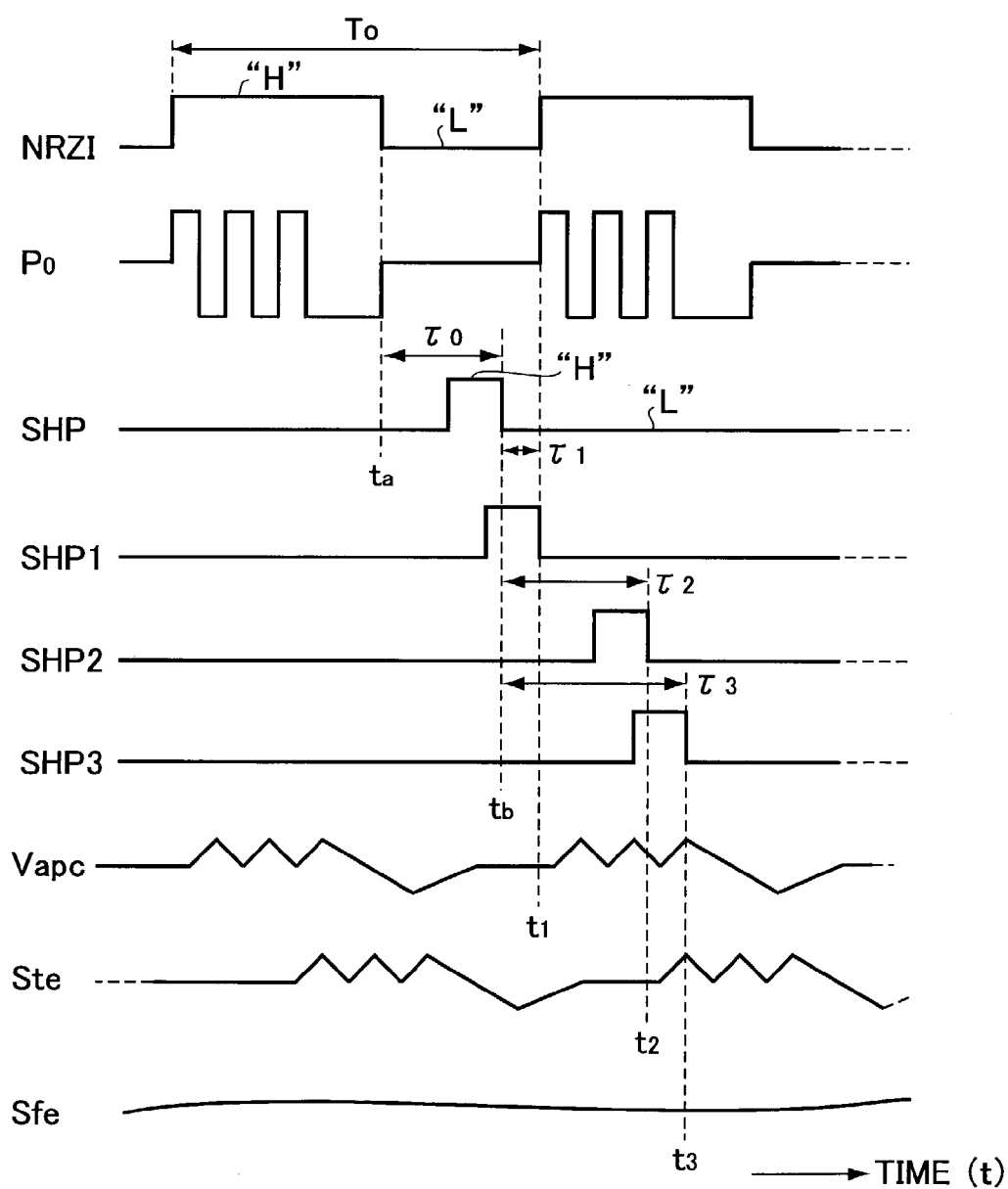
FIG. 4 is an explanatory timing chart illustrating the operation of the information recording apparatus according to the embodiment.

FIG. 4 is a timing chart illustrating the variations in the write signal NRZI, the write laser beam Po, the sample and hold signals SHP, SHP1, SHP2, and SHP3, the detection signal Vapc, the tracking error signal Ste, and the focus error signal Sfe, which are caused in an information recording operation carried out at any one of the aforementioned linear speeds.

Referring to FIG. 4, when the clock signal CK having any frequency fcki of the aforementioned frequencies fck1, fck2, fck3 and so forth is supplied from the system controller to the pulse generator 1, the pulse generator 1 outputs the write signal NRZI corresponding to the write data Dwt in sync with the clock signal CK.

The system controller then outputs the data regarding the delay times $\tau 0$, $\tau 1$, $\tau 2$, and $\tau 3$ corresponding to the frequency fcki. In response thereto, the pulse generator 1 outputs the sample and hold signal SHP which is set at the delay time $\tau 0$ while the delay devices DLY1, DLY2, and DLY3 set each of the delay times $\tau 1$, $\tau 2$, and $\tau 3$.

For example, suppose that the frequency fcki has been set at the frequency fck1 as shown in FIG. 3. In this case, the delay time τ0 of the sample and hold signal SHP is set at "τ01," while the delay times τ1, τ2, and τ3 of the delay devices DLY1, DLY2, and DLY3 are set at "τ11," "τ21," and "τ31," respectively.

Subsequently, within a period during which the write signal NRZI is at the logic "H," the drive current Iwt corresponding to the write data Dwt is supplied to the semiconductor laser LD. Then, as illustrated, the write laser beam Po is emitted at a variable power, thereby allowing a mark corresponding to the write data Dwt to be recorded onto the optical disc DSC.

At this stage, the sample and hold signal SHP is output within a period To, at the beginning of which the write signal NRZI takes on the logic "H" corresponding to some write data Dwt and just after the end of which the write signal NRZI takes on the logic "H" again corresponding to the subsequent write data Dwt.

For example, as illustrated, after the write signal NRZI has taken on the logic "H," the sample and hold signal SHP is output with respect to a point in time ta at which the write signal NRZI takes on the logic "L" to temporarily drop the power of the write laser beam Po to thereby create a blank area on the optical disc DSC.

That is, the sample and hold signal SHP is shaped in its waveform and then output so as to take on the logic "H" some time after the point in time ta and then on the logic "L" at a point in time tb at which the delay time τ0 expires. The point in time tb is defined to end before the period To ends.

On the other hand, the delay devices DLY1, DLY2, and DLY3 delay the sample and hold signal SHP to thereby output the sample and hold signals SHP1, SHP2, and SHP3 each being delayed by their respective delay times τ1, τ2, and τ3 with respect to the aforementioned point in time tb.

When the sample and hold signal SHP1 is output at such a timing, the sample and hold circuit 4 positively samples and holds the detection signal Vapc, which is delayed by the delay time group of the I-V converter 3 and output therefrom, at a point in time t1 in FIG. 4, and then supplies the resulting detection signal Vsh thus held to the feedback control circuit 5.

When the aforementioned sample and hold signal SHP2 is supplied to the sample and hold circuit 8, the sample and hold circuit 8 positively samples and holds the tracking error signal Ste, which is delayed by the delay time group of the tracking error generation circuit 6 and output therefrom, at a point in time t2 in FIG. 4, and then supplies the tracking servo signal TE to the tracking actuator T.

When the aforementioned sample and hold signal SHP3 is supplied to the sample and hold circuit 9, the sample and hold circuit 9 positively samples and holds the focus error signal Sfe, which is delayed by the delay time group of the focus error generation circuit 7 and output therefrom, at a point in time t3 in FIG. 4, and then supplies the focus servo signal FE to the focus actuator F.

As described above, the information recording apparatus according to the embodiment includes the delay devices DLY1, DLY2, and DLY3 which set delay times τ1, τ2, and τ3 each corresponding to their respective delay time groups of the I-V converter 3, the tracking error generation circuit 6, and the focus error generation circuit 7, which are each provided in the preceding stage of their respective sample and hold circuits 4, 8, and 9. The sample and hold circuits 4, 8, and 9 sample and hold the detection signal Vapc, the tracking error signal Ste, and the focus error signal Sfe, respectively, in sync with the sample and hold signals SHP1, SHP2, and SHP3, which are delayed by their respective delay devices DLY1, DLY2, and DLY3.

Accordingly, for example, upon writing information at a high speed, this makes it possible for the sample and hold circuits 4, 8, and 9 to positively sample and hold each of the detection signal Vapc, the tracking error signal Ste, and the focus error signal Sfe without being adversely affected by each delay time group of the I-V converter 3, the tracking error generation circuit 6, and the focus error generation circuit 7. This in turn makes it possible to implement highly accurate power control, tracking servo, and focus servo.

Furthermore, as shown in FIG. 3, since each of the delay times τ0, τ1, τ2, and τ3 is adjusted in response to the rotational speed (the linear speed) of an optical disc DSC or the speed of the information write operation, the frequency at which the detection signals Sapc and Sft are produced varies in response to the speed of the information write operation. Thus, even when any change occurs in each delay time group property of the I-V converter 3, the tracking error generation circuit 6, and the focus error generation circuit 7, the detection signal Vapc, the tracking error signal Ste, and the focus error signal Sfe can be properly sampled and held. This in turn makes it possible to implement highly accurate power control, tracking servo, and focus servo.

In the embodiment described above, each of the delay times τ0, τ1, τ2, and τ3 is variably adjusted in response to the aforementioned speed of the information write operation to thereby implement highly accurate sampling and holding. However, each of the delay times τ0, τ1, τ2, and τ3 needs not necessarily to be variably adjusted but may be fixed.

That is, when little change occurs in each delay time group of the I-V converter 3, the tracking error generation circuit 6, and the focus error generation circuit 7 against variations in the frequency at which the detection signals Sapc and Sft are caused by a change in the speed of the information write operation, each of the delay times τ0, τ1, τ2, and τ3 may be pre-fixed on the basis of each of the delay times having little changes.

For example, it is possible to fix each of the delay times τ0, τ1, τ2, and τ3 by using high-speed devices having a high transfer rate to form the I-V converter 3, the tracking error generation circuit 6, and the focus error generation circuit 7.

Figure 5:
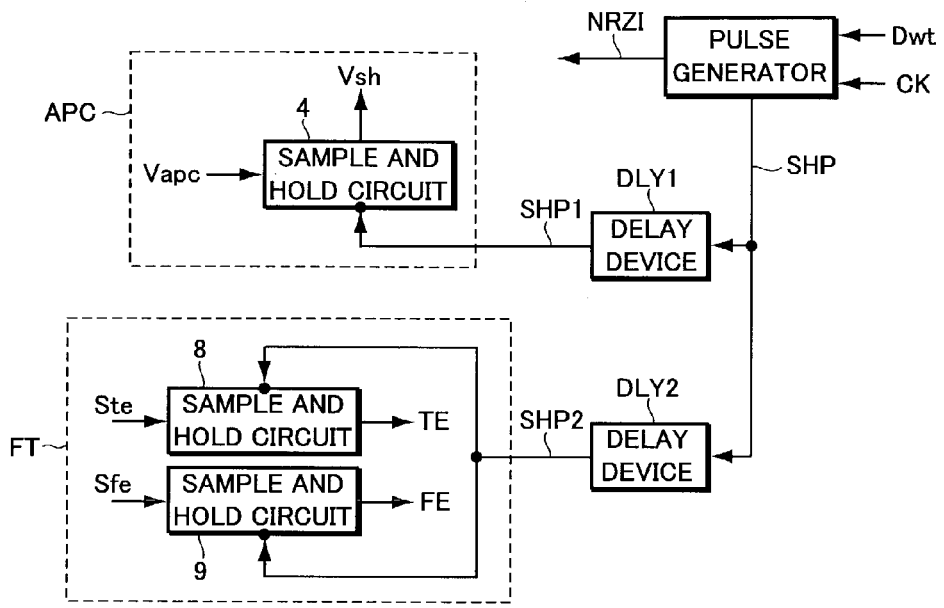
FIGS. 5A and 5B are explanatory views illustrating the configuration and operation of a first modified example according to the embodiment.
Figure 5:
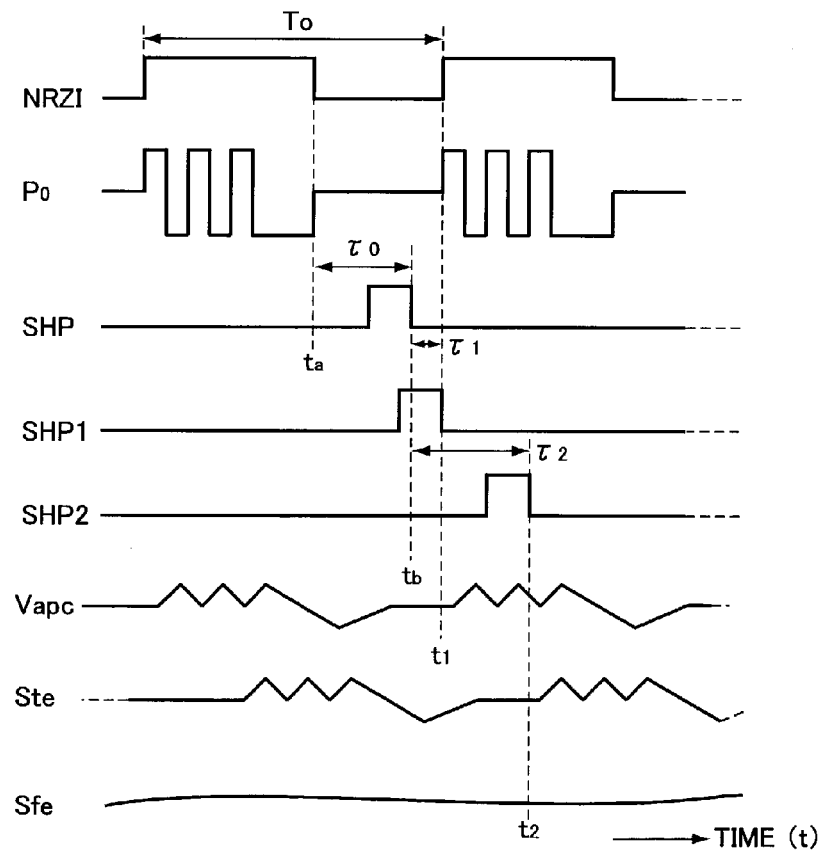

As a first modified example of this embodiment, it is also possible to use such a configuration as illustrated in FIG. 5A. FIG. 5A illustrates mainly the sample and hold circuits 4, 8, and 9 and their associated delay devices DLY1 and DLY2, all of which are extracted from FIG. 1.

In this modified example, the delay device DLY3 shown in FIG. 1 is eliminated, and the sample and hold circuits 8 and 9 perform a sampling and holding operation in sync with the sample and hold signal SHP2 output from the delay device DLY2 instead of the delay device DLY3.

Accordingly, as shown in the timing chart illustrated in FIG. 5B, the sample and hold circuit 9 samples and holds the focus error signal Sfe at the same point in time t2 at which the sample and hold circuit 8 samples and holds the tracking error signal Ste.

According to the first modified example configured as such, the sample and hold circuit 4 can properly sample and hold the detection signal Vapc in sync with the sample and hold signal SHP1 delayed by the delay time τ1 corresponding to the delay time group of the I-V converter 3, while the sample and hold circuit 8 can also properly sample and hold the tracking error signal Ste in sync with the sample and hold signal SHP2 delayed by the delay time τ2 corresponding to the delay time group of the focus error generation circuit 7.

Furthermore, since a detection signal, having information regarding focus error, of the detection signals Sft varies at a lower frequency against the delay time group of the focus error generation circuit 7, it is possible to output the focus servo signal FE which exerts no adverse effects on the focus servo operation even when the sample and hold circuit 9 samples and holds the focus error signal Sfe in sync with the sample and hold signal SHP2.

For this reason, the first modified example makes it possible to implement appropriate power control, tracking servo, and focus servo, and reduce the size of the circuits.

Figure 6:
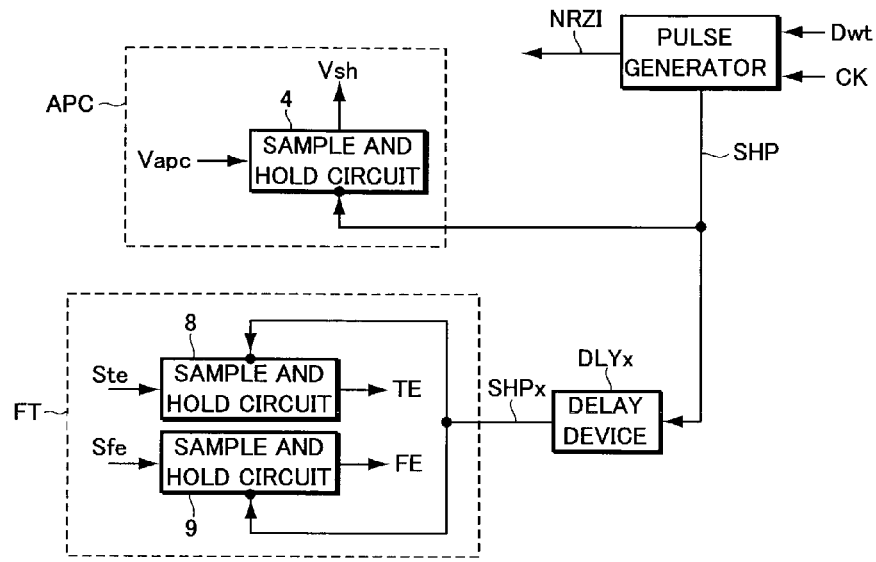
FIGS. 6A and 6B are explanatory view illustrating the configuration and operation of a second modified example according to the embodiment.
Figure 6:
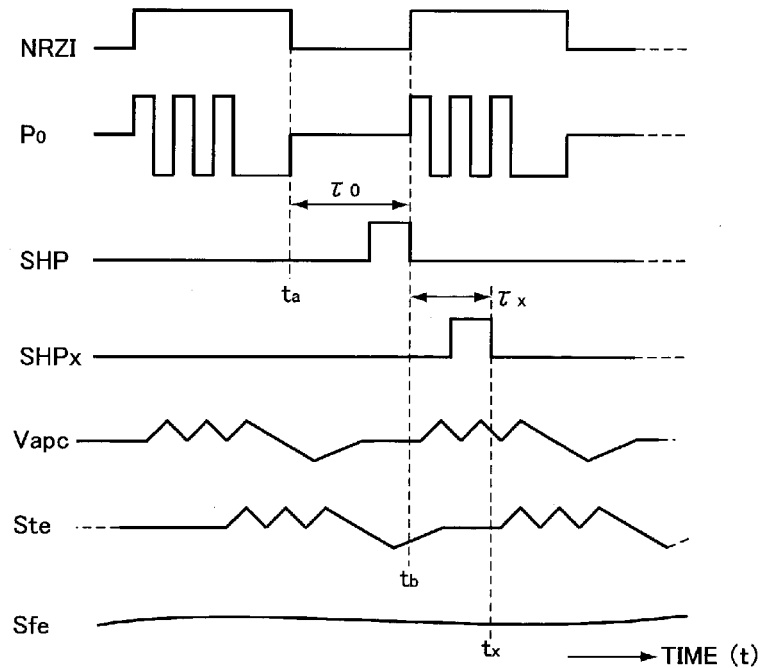
Figure 7:
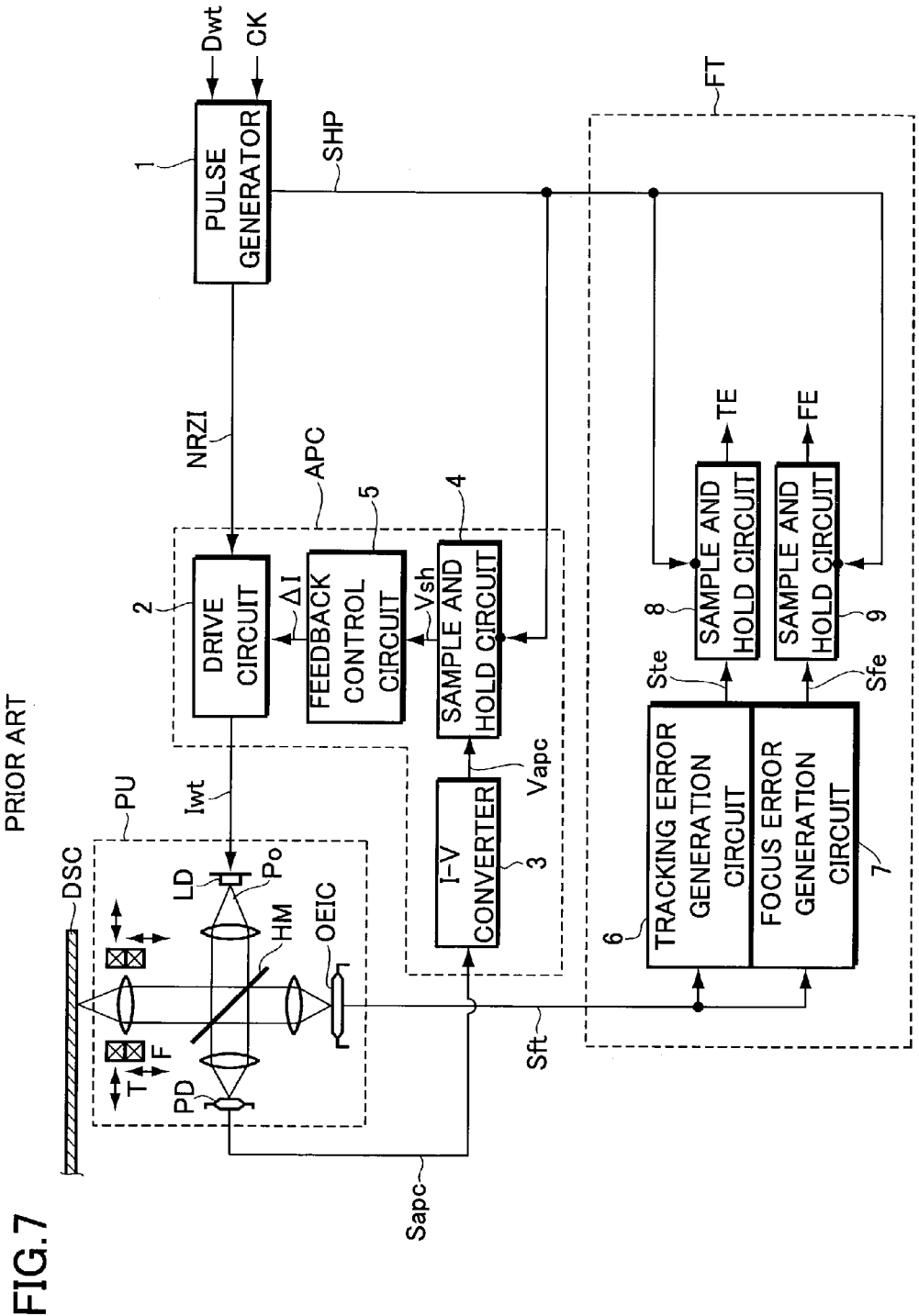
FIG. 7 is a block diagram illustrating the configuration of a prior-art information recording apparatus.
Figure 8:
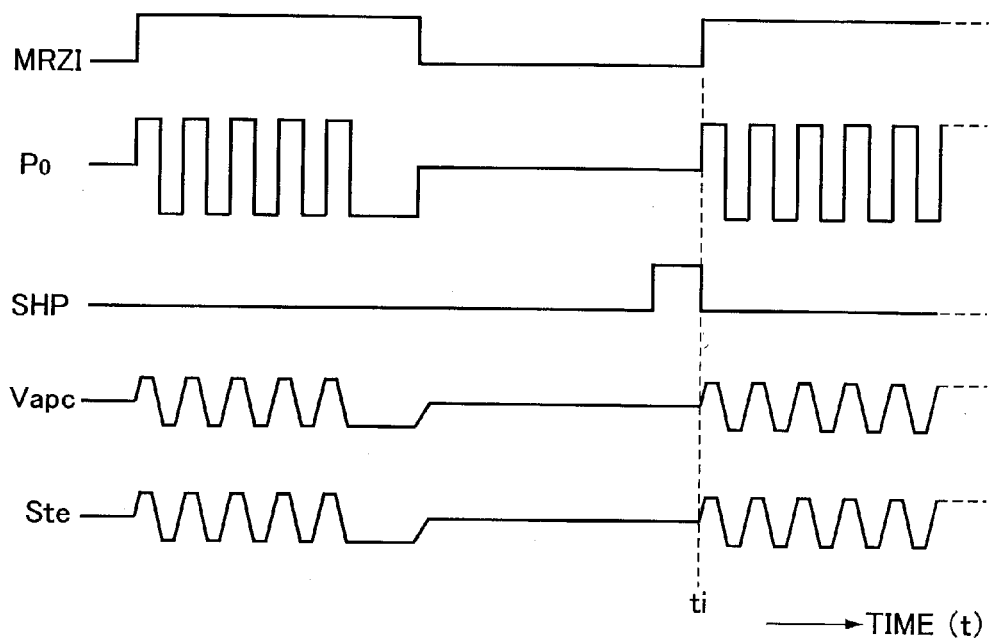
FIGS. 8A and 8B are explanatory timing charts illustrating the operation of the prior-art information recording apparatus.
Figure 8:
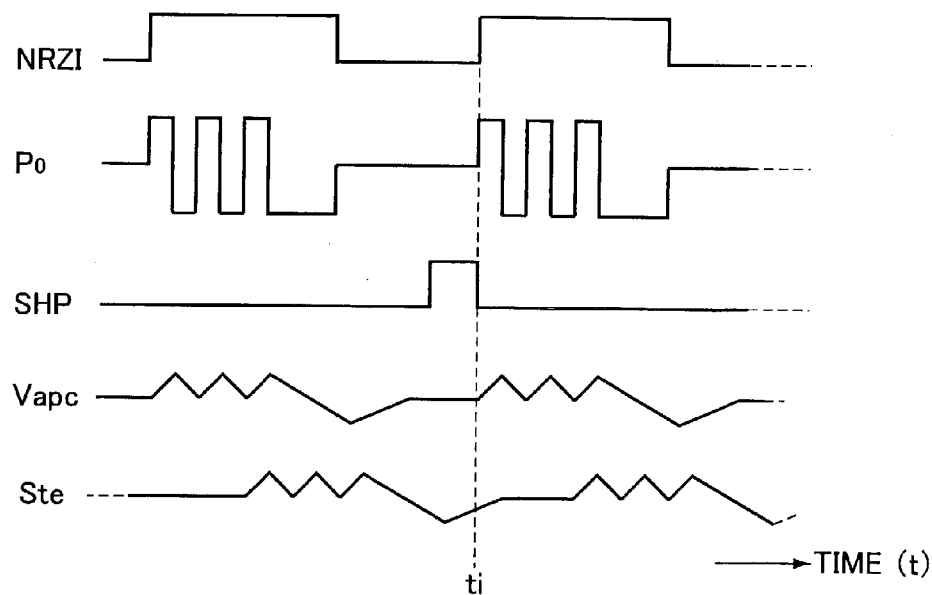

On the other hand, as a second modified example of this embodiment, such a configuration may also be employed as shown in FIG. 6A. FIG. 6A illustrates mainly the sample and hold circuits 4, 8, and 9 of FIG. 1 and their associated delay device DLYx.

In this modified example, as shown in the timing chart illustrated in FIG. 6B, the delay time $\tau 0$ of the sample and hold signal SHP from the aforementioned point in time ta is pre-set in accordance with the delay time group of the I-V converter 3 and then output from the pulse generator 1.

The sample and hold circuit 4 then samples and holds the detection signal Vapc in sync with the sample and hold signal SHP.

The delay device DLYx delays the sample and hold signal SHP, allowing the sample and hold circuits 8 and 9 to sample and hold their respective tracking error signal Ste and focus error signal Sfe in sync with the resulting sample and hold signal SHPx thus delayed.

The delay time $\tau x$ of the delay device DLYx is set at the time corresponding to the delay time group of the tracking error generation circuit 6. Accordingly, the sample and hold signal SHPx output from the delay device DLYx is output in sync with the point in time tx delayed by the time corresponding to the delay time group of the tracking error generation circuit 6 with respect to the point in time tb immediately after the aforementioned delay time $\tau 0$.

According to the second modified example configured as such, the sample and hold circuit 4 can properly sample and hold the detection signal Vapc in sync with the sample and hold signal SHP pre-delayed by the delay time $\tau 0$ corresponding to the delay time group of the I-V converter 3.

Furthermore, the sample and hold circuit 8 can also properly sample and hold the tracking error signal Ste in sync with the sample and hold signal SHPx delayed by the delay time $\tau x$ corresponding to the delay time group of the tracking error generation circuit 6.

Still furthermore, since a detection signal, having information regarding focus error, of the detection signals Sft varies at a lower frequency against the delay time group of the focus error generation circuit 7, it is possible to output the focus servo signal FE which exerts no adverse effects on the focus servo operation even when the sample and hold circuit 9 samples and holds the focus error signal Sfe in sync with the sample and hold signal SHPx.

For this reason, the second modified example enables the implementation of appropriate power control, tracking servo, and focus servo, and can reduce the size of the circuits.

It is to be understood that the information recording apparatus according to this embodiment including the first and second modified examples described above has been illustrated only as a preferred embodiment of the present invention. Thus, still further modified examples corresponding to the principle of the present invention are also included in the present invention.

For example, the aforementioned sample and hold signals SHP, SHP1, SHP2, SHP3, and SHPx to be supplied to the sample and hold circuits 4, 8, and 9 need not to be generated by means of the delay devices DLY1, DLY2, DLY3, and DLYx, shown in FIGS. 1, 5A, and 6A.

That is, the delay devices can be appropriately arranged so as to adjust the sampling and holding timing of each of the sample and hold circuits 4, 8, and 9 in order to eliminate the effects exerted by the delay time group of each of the I-V converter 3, the tracking error generation circuit 6, and the focus error generation circuit 7, which are disposed in the preceding stages of their respective sample and hold circuits 4, 8, and 9.

FIGS. 1, 5A, and 6A show each of the delay devices as separated from the power control system APC and the focus tracking servo system FT, however, each of the delay devices may be included in their respective power control system APC and the focus tracking servo system FT.

Each of the delay devices shown in FIGS. 1, 5A, and 6A is a one-input one-output delay device, but may also be implemented using a one-input multi-output delay device or delay circuit which receives the sample and hold signal SHP from the pulse generator 1 and outputs a plurality of sample and hold signals SHP1, SHP2, SHP3, and SHPx each delayed by the predetermined delay times $\tau 1$, $\tau 2$, $\tau 3$, and $\tau x$ as described above.

As described above, according to the present invention, the detection signal corresponding to the power of a light beam, the tracking error signal, and the focus error signal are delayed by the times each corresponding to the delay time of their respective first, second, and third generation unit and then sampled and held. Since the power adjustment, the tracking servo, and the focus servo are performed on the basis of each result of the sample and hold operations, it is possible to perform adjustments to the power, the tracking servo, and the focus servo with high accuracy without being affected by the delay times of the first, second and third generation unit.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording apparatus for writing information onto an information storage medium using a light beam emitted from a light source, comprising:

a first detection unit for detecting a power of a light beam emitted from said light source;

a second detection unit for detecting a non-track condition and an in-focus condition of said light beam relative to said information storage medium;

a first generation unit for generating a detection signal indicative of a variation in power of the light beam on the basis of a detection signal output from said first detection unit;

a second generation unit for generating a tracking error signal on the basis of a detection signal output from said second detection unit;

a third generation unit for generating a focus error signal on the basis of a detection signal output from said second detection unit;

a first control unit for adjusting the power of the light beam emitted from said light source on the basis of the detection signal generated by said first generation unit;

a second control unit for performing tracking servo on the basis of the tracking error signal generated by said second generation unit; and a third control unit for performing focus servo on the basis of the focus error signal generated by said third generation unit, and at least one delay device delaying a sample and hold signal which is in sync with information to be written and is to be supplied to a focus and tracking servo system formed from said second and third generation units and said second and third control units, wherein said first control unit samples and holds the detection signal generated by said first generation unit, in sync with a timing delayed by a time corresponding to a delay time of said first generation unit, and adjusts the power of said light beam on the basis of the detection signal held, said second control unit samples and holds the tracking error signal generated by said second generation unit, in sync with a timing delayed by a time corresponding to a delay time of said second generation unit, and performs said tracking servo on the basis of the tracking error signal held, and said third control unit samples and holds the focus error signal generated by said third generation unit, in sync with a timing delayed by a time corresponding to a delay time of said third generation unit, and performs said focus servo on the basis of the focus error signal held.

2. The information recording apparatus according to claim 1, comprising a further delay device for delaying sample and hold signal to be supplied to a power control system.

3. The information recording apparatus according to claim 1, comprising two delay devices for delaying sample and hold signal to be supplied to the focus and tracking servo system, one is for the second generation unit and the other is for the third generation unit.

4. The information recording apparatus according to claim 1, wherein the detection signal is a signal which corresponds to one of power levels of light pulses, the tracking error signal is a signal which corresponds to one of power levels of light pulses, the focus error signal is a signal which corresponds to one of power levels of light pulses.

* * * * *